(12) United States Patent
Mead

(10) Patent No.: US 7,177,050 B2
(45) Date of Patent: Feb. 13, 2007

(54) SYSTEM FOR REDUCING SCRATCH VISIBILITY

(75) Inventor: Terance William Mead, Herts (GB)

(73) Assignee: Cintel International Limited (GB)

( * ) Notice: Subject to any disclaimer, the term of this patent is extended or adjusted under 35 U.S.C. 154(b) by 952 days.

(21) Appl. No.: 10/026,405

(22) Filed: Dec. 19, 2001

(65) Prior Publication Data

US 2002/0089700 A1 Jul. 11, 2002

(51) Int. Cl.
*H04N 1/04* (2006.01)
*H04N 5/253* (2006.01)

(52) U.S. Cl. .................. 358/2.1; 358/487; 348/96

(58) Field of Classification Search .............. 358/1.9, 358/2.1, 505–506, 408, 487, 474–475; 348/96–112
See application file for complete search history.

(56) References Cited

U.S. PATENT DOCUMENTS 4,481,414 A 11/1984 Gasper
5,068,739 A 11/1991 Filo
5,363,232 A 11/1994 Tokue

FOREIGN PATENT DOCUMENTS

| GB | 1409153 | 10/1975 |
|----|---------|---------|
| GB | 2323495 A | 9/1998 |
| WO | WO 83/02869 | 8/1983 |

OTHER PUBLICATIONS

U.K. Patent Office Search Report for corresponding U.K. application no. GB 0031127.4 dated Oct. 26, 2001.

*Primary Examiner*—Thomas Lee
*Assistant Examiner*—Stephen Brinich
(74) *Attorney, Agent, or Firm*—Ostrolenk, Faber, Gerb & Soffen, LLP

(57) ABSTRACT

A film scanner, such as a telecine, includes a light source, collection optics and one or more light sensors to reduce image signals representative of an image on film. In addition, a reflector arrangement is provided which has an internally reflective cavity, such as an integrating sphere, to captor light which may have been scattered from the usual light path and provided to an additional sensor. Compensations can thus be made for light scattered in any direction.

32 Claims, 5 Drawing Sheets

SYSTEM FOR REDUCING SCRATCH VISIBILITY

BACKGROUND OF THE INVENTION

The invention relates to the scanning of cinematographic film to produce electrical signals corresponding to the images stored on the film. In particular, the invention relates to telecine; a type of film scanner which converts film images to television signals.

Telecine or film scanning equipment used to produce such signals from cinematographic film have been known for many years, and are described for example in "TV and Video Engineers Reference Book" Chapter 39 Butterworth and Heinemann ISBN 0-7506-1021-2. There are two main types of film scanner: diffuse light illumination, and spot scanning. The former uses a diffuse light source to illuminate a frame of film and optics to image the illuminated frame on to a light detector, such as a line array or area array CCD detector. Spot scanning systems use a flying spot of light to successively illuminate points of film. Light transmitted by the film is collected by light collection optics and converted to electrical signals by a detector. The invention relates particularly to the type of telecine or film scanner that uses a scanning light source such as the known Ursa™ or C-Reality™ telecines of Cintel International Limited.

The illumination and light collection systems of the C-Reality™ telecine is described in simple terms with reference to FIG. 1, which shows a schematic form the main functional components. However, it should be noted that the design detail has been simplified for ease of description as would be known by the skilled person.

A Cathode Ray Tube (CRT) 1 produces a raster scan that is imaged onto the film 3 by an imaging lens group 2 light passing through the film is modulated by the colour and density of the film at each location or pixel scanned, this light being subsequently analysed into it's red, green, and blue components. The lenses 4 and 6 collect the light from the film and apply it to the blue Avalanche Photo Diode (APD) sensor 7 via the blue separating dichroic mirror 5. The mirror 5 transmits blue light but reflects red and green to the red separating dichroic mirror 8, which reflects the red light through lens 9 to the red APD sensor 10. The remaining green light passes through the mirror 8 and lens to the green APD sensor 12. The three electrical colour signals are then passed through electronic processing circuits, converted into a television signal format and provided as output signals which are typically then recorded on video tape equipment. Alternatively, the signals may be converted to video data format and stored in data recording equipment.

We have appreciated that it would be beneficial to collect more of the light that is scattered by scratches on the surface of, or other deformities in or on, the film. Such scratches cause scattering of the light, which may then be lost from the optical system and cause a reduction in the signal received by the photo sensors, if this light could be effectively collected then the visibility of the scratches in the resultant electrical images would be much reduced. FIG. 1 shows the path of the imaged rays passing through the film, and also shows a ray typical of that scattered by a film scratch, it can be seen that this latter ray misses the collecting lenses 6,9,11.

Various systems for reducing the visibility of scratches have been proposed. International patent WO 83/02869 A1 and U.S. Pat. No. 4,481,414 describe various methods of improving the collection of such scattered light by imaging and or by reflective means. UK patent GB 1409153 suggests a scheme of using additional photo sensors to collect some of this scattered light to enable the substitution of a suitable alternative signal. UK patent application GB 2323495A also discloses improved collection of the scattered light by imaging and reflective means and the use of additional sensors to collect the scattered light and add this in suitable proportion to the main signal.

One problem we have appreciated, however, is that there is a limit to the amount of this scattered light that can be collected in a practical optical imaging system. This limit is due to the physical limitations of an optical imaging system described by the LaGrange optical invariant that can be referenced at page 2 to 8 of the "Handbook of Optics" published by the McGraw-Hill Book Company ISBN 007-047710-8.

In short, in any optical system comprising only lenses, the product of the image size and ray angle is a constant, or invariant, of the system. This can be related to the numerical aperture which is the ratio of the physical aperture of a lens divided by the focal length, which for the maximum image is the ray angle. Thus, in a raster scan telecine described above, the optical invariant shows that the product of the maximum scanned film dimension and the numerical aperture of the rays passing through the film will, in a theoretically perfect optical system, be equal to the product of the maximum active sensor dimension and the numerical aperture of the rays arriving at the sensor. The dimensions of the film is a fixed requirement and that of the sensor is chosen to give best signal performance, whilst the numerical aperture of the rays arriving at the sensor are limited by the sensor characteristics. The maximum numerical aperture that can be collected is therefore limited by these parameters.

Light scattered by a film scratch will normally include a significant proportion outside of this angle that cannot be collected. Any attempt to increase the angle of scattered light collected will result in a loss of imaged light collected or a loss of light from the extremes of the image; neither effect can be tolerated in high performance equipment.

A known solution is to use a large sensor, however in the example of the C-Reality telecine the sensor is for reasons of best performance chosen to be an avalanche photo diode of 10 mm diameter. It is also known that the effective numerical aperture of the photo sensor can, in some instances, be increased by the use of a high refractive index substance fitted between the active surface of the photo sensor and the optical system.

To try and overcome these limitations of an imaging system, a further known method of improving the scattered ray collection is to use an integrating sphere or cylinder to collect all light from film (both scratched and unscratched areas). This method will collect substantially all angles of light rays from the film, but suffers the disadvantage of being very inefficient so would not collect enough intensity of the light from the film (from both scratched and unscratched regions). As a result, there is a loss of quality.

SUMMARY OF THE INVENTION

We have appreciated the limitations of lens imaging systems for the collection of light in a film scanner. We have also appreciated that diffuse light collection devices such as integrating spheres or cylinders are not sufficiently efficient in themselves to produce a quality signal from a film image.

The invention is defined in the claims to which reference is directed. In an embodiment of the invention a new form of optical device is provided for the collection of light in a film scanner comprising both imaging optics and an integrating element to collect both light from unscratched and scratched areas of film.

The light collection system according to the invention when disposed in a film scanner has the advantage that light transmitted by film and imaged onto one or more image light sensors is transmitted in the usual manner, whereas light scattered by scratches is collected within the internally reflecting cavity and detected by the scratch light sensor. The signal produced by the scattered light sensor can be used to compensate the signal produced by the image light sensors to reduce the visibility of a scratch or other defect causing scattering.

In known systems discussed above the scattered light is collected by methods which are dependent on the angle of scatter. Film scratches cause the light to be scattered in an unpredictable fashion, so that some scratches would produce a larger detected signal than others would, and a compromise correction must be accepted. This is even more significant when small area photo-sensors are being used.

The various reflecting methods above also result in the scattered light being directed to the wrong colour sensors. This would cause coloured scratches and scratches with rainbow edges.

An advantage of the present invention is that the internally reflective cavity provides collection of the scattered light that is more uniform with angle, and is of a constant colour with variation of angle. In an embodiment when a suitable proportion of this detected scattered light is added back to the image sensors, then the scratch will be substantially eliminated regardless of the range of scatter angles. The internally reflective cavity is preferably an integrating sphere which performs this function ideally due to its shape and to its diffuse reflecting inner surface, however other shapes or even spectrally reflective surfaces would give useful benefit.

The film scanner is preferably a telecine for converting from film images to television signals, whether analogue or digital.

BRIEF DESCRIPTION OF THE DRAWINGS

Embodiments of the invention will now be described, by way of example only, and with reference to the accompanying figures, in which.

Figure 1:
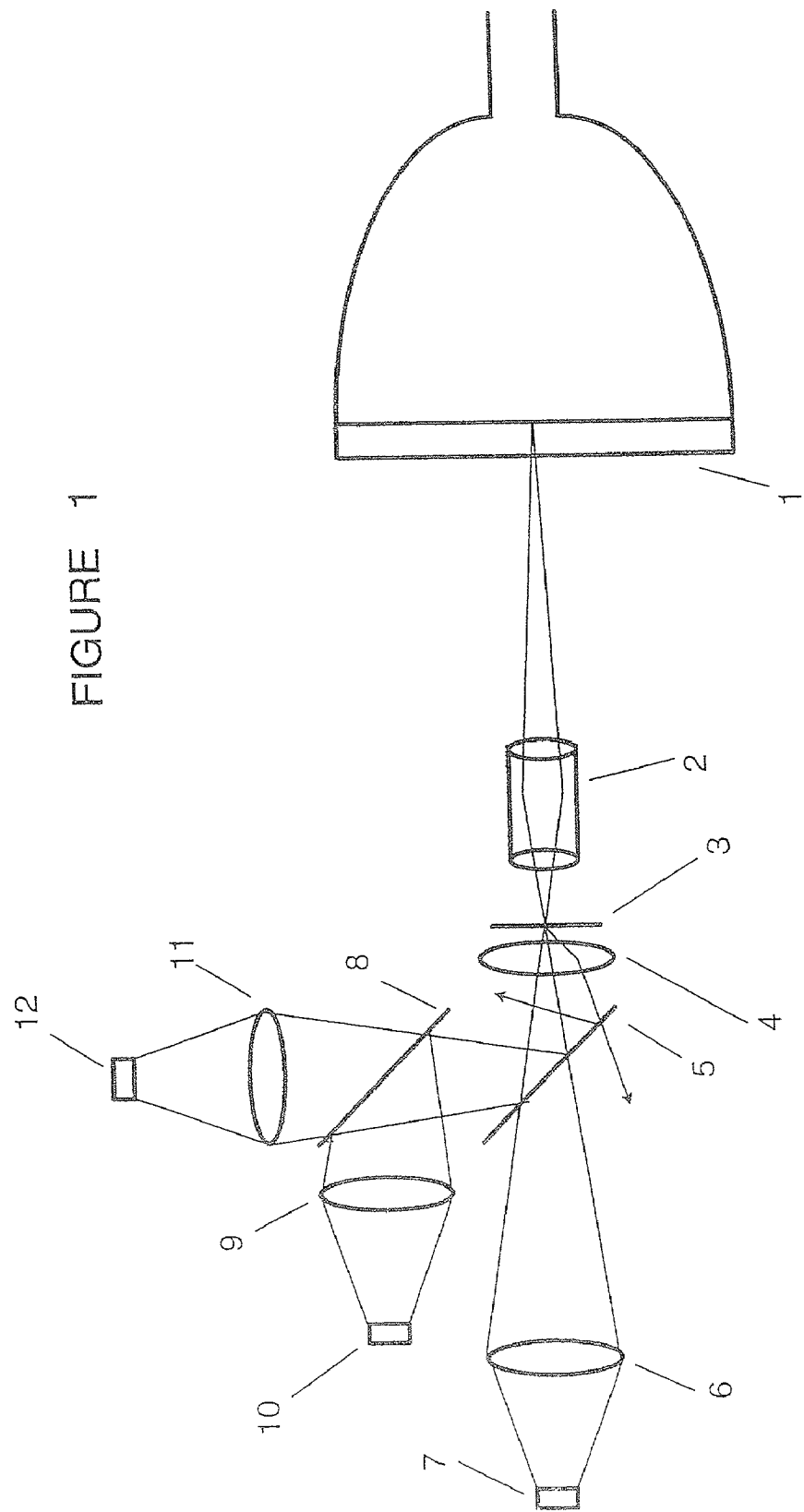
FIG. 1: is a schematic view of the main components of a flying spot telecine.
Figure 2:
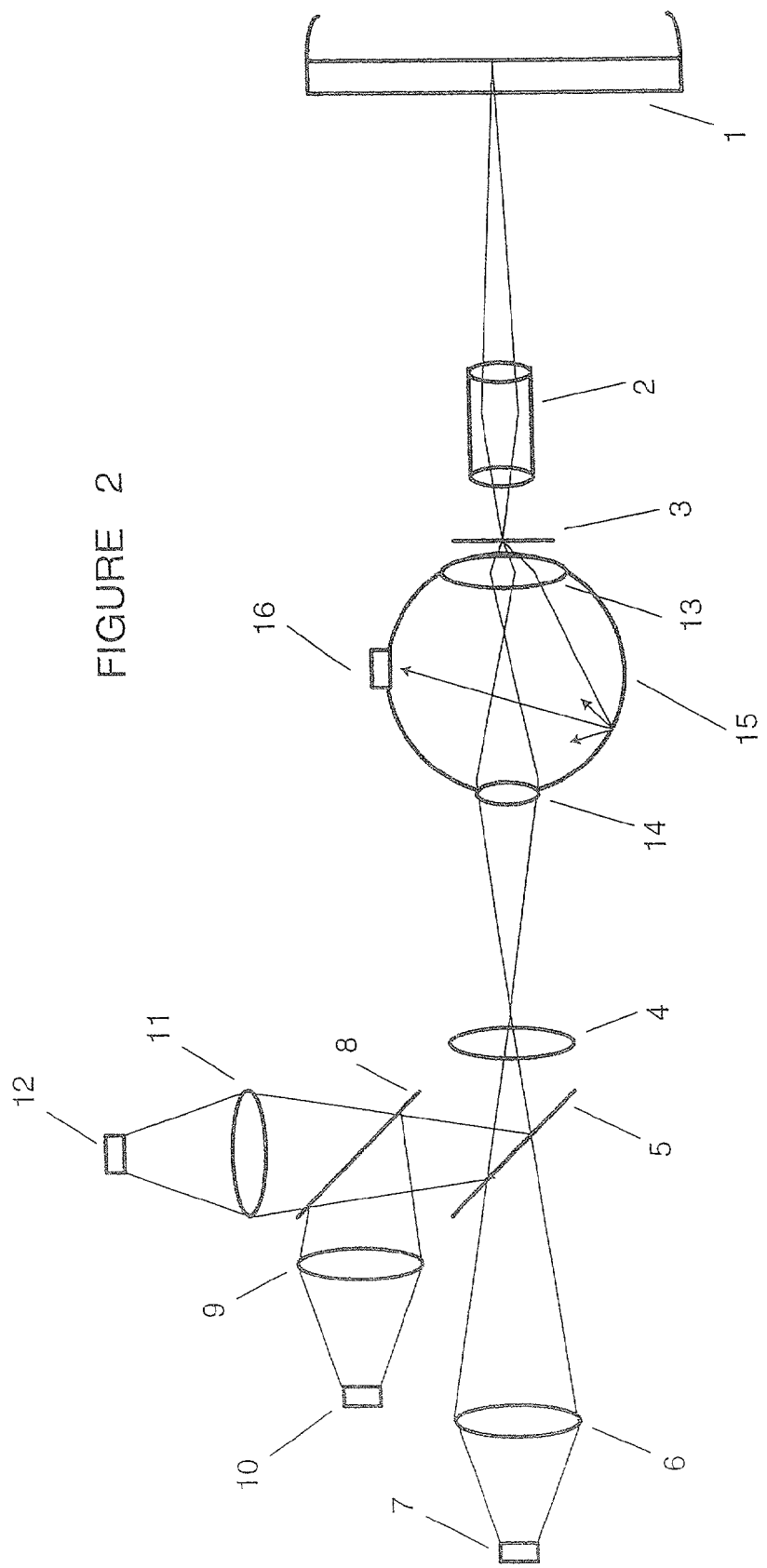
FIG. 2: is a schematic view of a telecine embodying the invention.

The main functional components of a film scanner embodying the invention are shown in FIG. 2. In this description the term film scanner is used to cover any type of scanner whether analogue, digital, real time or non-real time and includes telecine for converting to television or video signals. Whilst the invention could apply to a variety of film scanners, the embodiment described is a flying spot film scanner using a cathode ray tube, in particular a telecine. The invention applies equally to other flying spot film scanners such as laser scanners.

The embodiment comprises a raster scan light source in the form of a CRT 1, an imaging lens group 2, collection lenses 4, 6, 9, 11, dichroics 5,8 and image light sensors 7, 10, 12 as previously described. In addition, a light collection system comprises lenses 13, 14 and a reflector 15 defining an internally reflective cavity in the form of an integrating sphere.

The embodiment shown in FIG. 2 thereby combines a modified form of integrating sphere 15 with a conventional imaging path. An important part of the embodiment is that the conventional imaging path is retained so that imaged rays arrive at the image sensor(s) and no signal degradation is suffered. It is important that the input and image exit port of the sphere are positioned and of suitable dimension not to interfere with the imaged optical path. It is also important that these ports are as small as possible to avoid losses in the scattered light signal. It is preferred that the sphere should contain no optical components so that the scattered signal output is substantially diffuse and independent of scatter angle. In order to accommodate the additional integrating sphere an imaging system in the form of an optical relay system 13 and 14 is inserted in the light collection path, this relay system routes the imaged rays directly through the integrating sphere. The diameter of the integrating sphere exit port is positioned at a pupil image of the imaging lens group 2 and is chosen so that it just passes all of the imaged rays. Some of the scattered rays from a film scratch will pass through the imaged path in the normal way but others, which would otherwise have been lost, strike the walls of the integrating sphere, and are diffused and bounced around the sphere until they find an exit port. A scratch sensor 16 here an Avalanche Photo Diode (APD) collects a portion of these rays and provides a signal representative of the rays scattered by film scratches, etc.

In a first embodiment of the invention the scratch APD sensor 16 consists of three individual sensors each including a colour filter to match the colour response to that of the red, green and blue channel. The signals from the red, green and blue scratch sensors are adjusted in level and added respectively to the signals from the red, green and blue image sensors. This process effectively replaces the contribution to the image signal that has been scattered by a film scratch, and so reduces the visibility of the scratch in the image. This embodiment thereby uses the integrating sphere to provide the three accurate scratch correction signals without detriment to the main imaged signal collection.

In a second embodiment of the invention it is recognised that the inefficiency of the integrating sphere may not provide a suitably large scratch signal for use in high quality film scanning. The signal collected by the sensors is limited by the radiant power from the cathode ray tube, the density of the film, the efficiency of the collecting system, and the efficiency of the sensors. The signal collected is further limited by the width of the colour spectrum passed to the sensor. In the case of the blue channel for example the energy collected is around ⅟₂₀ of the broadband energy available and this is further reduced to about ⅟₂₀₀ by the density of the orange coloured negative film mask. The second embodiment therefore uses a single sensor as the scratch sensor (16) with no colour filtering to give a substantial increase in the collected signal level that compensates for the inefficiency of the integrating sphere.

In either the first or second embodiments, the signals produced by the scratch sensor may be used to be added in various proportions to the signals from the red, green and blue sensors. As an alternative, the scratch signal is converted into a scratch flag that indicates the presence of a significant scratch on the film. The scratch flag is used to activate electronic substitution circuitry that replaces the scratched part of the image with data from an adjacent part of the image.

This technique of substituting damaged image data with alternative data from other parts of the picture is well known, and is used for example in video tape recorder "drop out compensation" as well as film damage compensation. As an example the paper "scratch and dirt concealment within a CCD based telecine" (Mead and Childs) from the proceedings of the International Broadcasting Convention 1984, describes a system using detection of infra red rays passing through the film to provide a scratch flag signal that activates a concealment algorithm where the picture information to left and right of the damaged location is blended to replace the damaged area.

In the first or second embodiments using this technique of scratch detection an accurate scratch flag signal is provided without detriment to the main imaged signal collection.

The preferred embodiment of the invention is the second embodiment using a single scratch sensor to improve the scratch signal quality but using the subsequent electronics to add this scratch signal to the main colour channels (as described in relation to the first embodiment), rather than generating a scratch flag signal. This technique of adding the scratch signal is preferred because it is less likely to produce incorrect results in the presence of detailed and moving pictures.

Additionally the scratch flag signal method can only operate successfully with infrequent damage such as film scratches, and cannot provide compensation for film grain. Adding the scratch signal can also replace light scattered by the grains of film and thereby reduce the visible effect of the film grain.

The scratch signal has passed through the colour film yet still has a relatively broadband colour response, therefore it will not be in true proportion to the amount of light scattered away from any one of the main colour channels (i.e. the light which would have passed to one of the image light sensors in the absence of a scratch). However knowledge of the film dye densities, together with the colour response of the four channels (red, green, blue, and scratch), enables the true proportions to be calculated for each channel. The main signals contain the necessary information about the film dye densities, and the colour response of the various channels is known and fixed, so appropriate correction signals can be calculated as follows.

Considering the red channel, most of the light rays scattered by a scratch on the film will fail to reach the red sensor, so the correction should consist of a signal representing those missing rays. The detected scratch signal will contain a contribution from a band of colours that would have been received by the red channel, together with a contribution of different proportions from the band of colours that would have been received by the other two channels. To compensate for this mixture of signals the following formula should be applied to the signals:

Red correction=Scratch*$k$*Red/($a$*Red+$b$*Green+$c$*Blue)

Where "Red correction" is the signal to be added to the red signal in order to compensate for scratches etc., "Scratch" is the detected scratch signal from the detector in the integrating sphere, "k" is a constant preferably adjustable by the operator to give optimum concealment of scratches, "Red", "Green", "Blue", are the detected colour signals, and "a, b, c" are constants representing the proportion of signal collected by the three colour channels with respect to the scratch signal. The value of K is determined by the relative channel gains and the collection characteristics of the integrating sphere, and is most easily determined by empirical adjusTMent. The values of a, b, c, can be calculated from the relative energy collected by each of the four channels, and should take into account the spectral response of the cathode ray tube, the sensors, the colour separation components, and the film dyes at minimum density. Typical values for operation with colour negative film stock might be a=0.035, b=0.1, c=0.005.

The formula shown above applies to the red channel correction but equivalent formulae would be used for correction of the green and blue channels. It is clear that various equivalent forms of the formulae could alternatively be used, in particular we have appreciated that it is convenient to adapt the formulae for efficient use with existing equipment.

Figure 3:
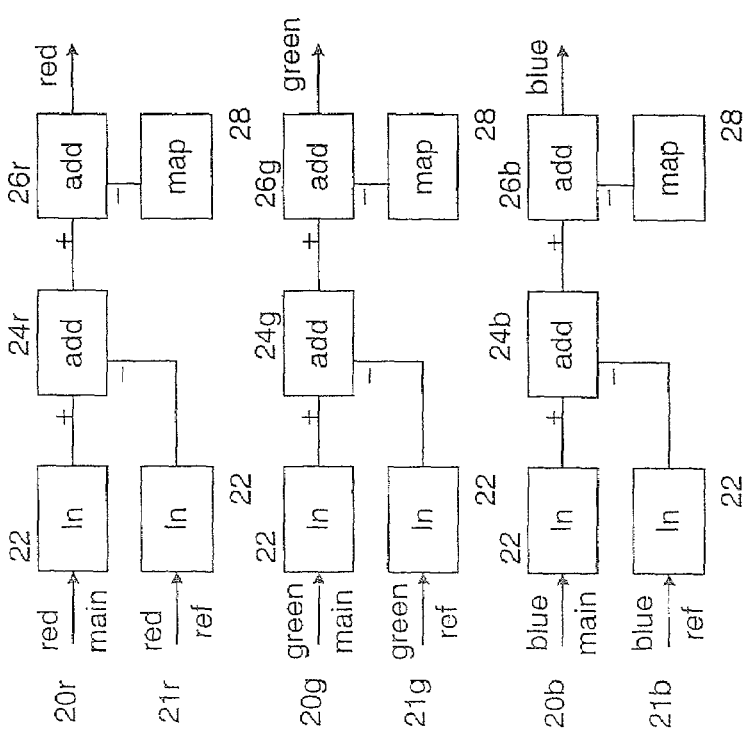
FIG. 3: is a schematic view of known shading correction circuitry for correcting image signals.

Circuitry which may be modified to provide the required functions is shading correction circuitry. FIG. 3 shows a schematic arrangement of known digital shading correction circuitry such as is used in the C-Reality™ telecine of Cintel International Limited, this circuitry compensates for non uniformity of the optical transmission, sensor sensitivity and cathode ray tube radiant output. Each colour channel 20*r*, 20*g*, 20*b* has an equivalent reference sensor channel 21*r*, 21*g*, 21*b*, with the same colour response derived from a respective reference sensor, aimed directly at the cathode ray tube; this detects signal variations and hence variations in the intensity of light produced by the cathode ray tube. The first part of the shading correction circuitry divides the main colour signal by this reference signal to remove the cathode ray tube variations. In FIG. 3 the main and reference signals for each colour are individually applied to a look up table 22 (shown as inputs) that gives the logarithm of these signals, then the log reference signal is subtracted from the log main signal in a series of adder circuits 24*r*, 24*g*, 24*b*. This process when followed by an antilogarithm stage (not shown) is equivalent to dividing the main signal by the reference signal. The antilogarithm stage is implemented in following circuitry to allow further logarithmic processing of the signal. The first stage correction of FIG. 3 is followed by a further adding stage 26*r*, 26*g*, 26*b* that subtracts a mapped correction waveform 28 corresponding to the optical shading and similar errors. Once again this is equivalent to a division of the signals.

Figure 4:
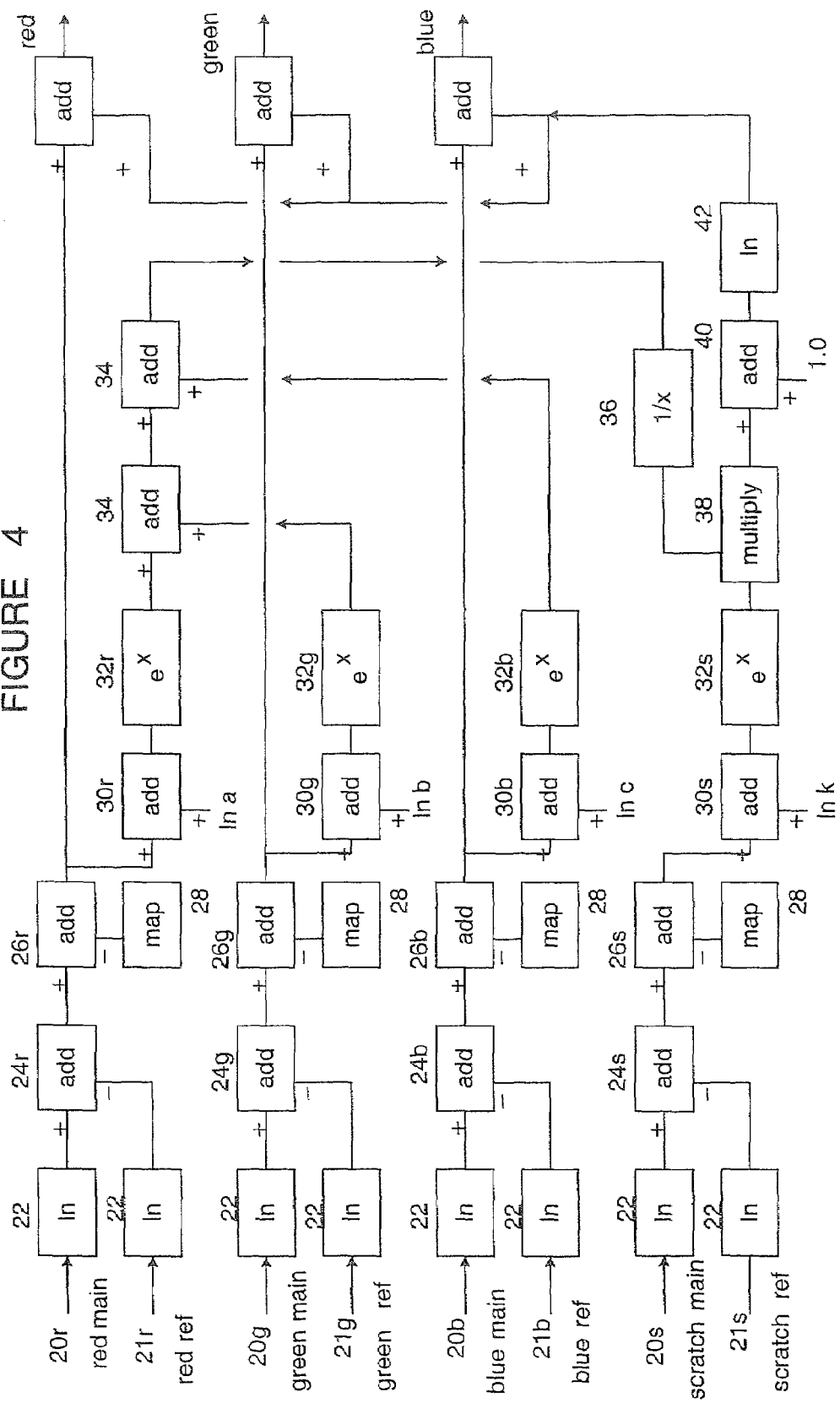
FIG. 4: is a schematic view of circuitry for correcting image signals in a telecine embodying the invention.

FIG. 4 is a schematic representation of one possible arrangement for use with either the first or second embodiment of the invention. The signals generally flow from left to right, the first stages of logarithm, two adders and shading map are as described in FIG. 3 with the addition of an extra channel 20*s* for the new scratch signal and a scratch reference 21*s* described later. After the process of correcting for variations in the CRT and other shading as described, the signals each then split into two paths, one path has the natural log of an appropriate constant (a, b, c, or k) added by adding circuitry 30*r*, 30*g*, 30*b* and is then passed through a look up table 32*r*, 32*b*, 32*g* that gives the antilogarithm of the input. The three colour signals are then added together in further adding circuits 34 then applied to a look up table 36 that gives the reciprocal of the input. The scratch signal goes through a similar process of adding 30*s* a log K signal and antilogged 32*s* to produce the scratch signal multiplied by k. The scratch signal from the antilogarithm look up table 32*s* is then multiplied by this reciprocal signal in a multiplier circuit 38 and has a value of unity added to it in an adder circuit 40 before being applied to a look up table 42 that gives the logarithm of the input. This modified scratch signal is then added to each of the colour signals from the shading map adder to produce the corrected colour signals red, green and blue.

Analysis of FIG. 4 shows that the following formulae are being applied to the signals:

ln Red+ln(1.0+e^(ln k+ln Scratch)/(e^(ln a+ln Red)+ (e^(ln b+ln Green)+(e^(ln c+ln Blue)))

After applying the following antilogarithm stage this result can be simplified into:

Red*(1+k*Scratch/a*Red+b*Green+c*blue)

This is simply another form of the previous equation

Red+Scratch*Red*k/(a*Red+b*Green+c*Blue).

Figure 5:
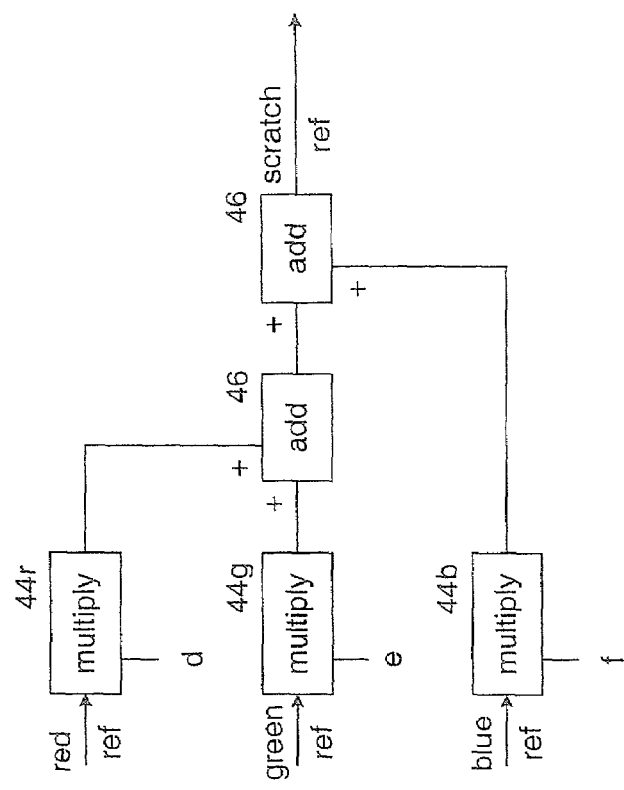
FIG. 5: is a schematic view of alternative circuitry for correcting image signals in a telecine embodying the invention.

For best operation of the scratch signal it is preferable that this signal also undergoes shading and reference correction, the shading correction can be done as normal but it is necessary to provide some form of reference signal 21s for the scratch channel. Since the scratch channel has a broadband colour response, one method would be to use an additional reference sensor with an equivalent broadband response. An alternative arrangement is shown in FIG. 5 where the multiplying 44r, 44g, 44b and adding 46 stages apply proportions d, e and f respectively of the red, green and blue reference signals from the respective reference sensors are summed to give a scratch reference signal. The proportions d, e and f are chosen to match the relative energies of the three colour signals extracted from the broadband response, and are typically around d=0.125, e=0.75, f=0.125.

The above-mentioned signal processing could equally be performed by a software algorithm in a computer system, this method may be preferred for slower data rates.

In FIG. 2 the collecting lenses are shown symbolically as normal spherical lenses, any of these lenses could consist of a group of lenses, or of lenses of a different type such as aspheric lenses. In particular it is advantageous to place the film close to the sphere entrance port and to minimise the area of this input port. These requirements are better achieved by the use of one or more Fresnel, lenticular, or holographic lenses as lenses 13 in FIG. 2. The advantage of these lenses is the ability to provide the required power in a thin lens.

Where specific reference is made in the above description to flying spot telecine or film scanners using a cathode ray tube, the same principles would apply to other forms of telecine or film scanner using a scanning light source. In particular a telecine using a scanned laser light source would particularly benefit since the light source is collimated and therefore a narrow aperture collection system could be used. The use of such narrow band collection would cause film scratches and the like to be much more visible, so the benefits of this invention would be even greater.

Figure 6:
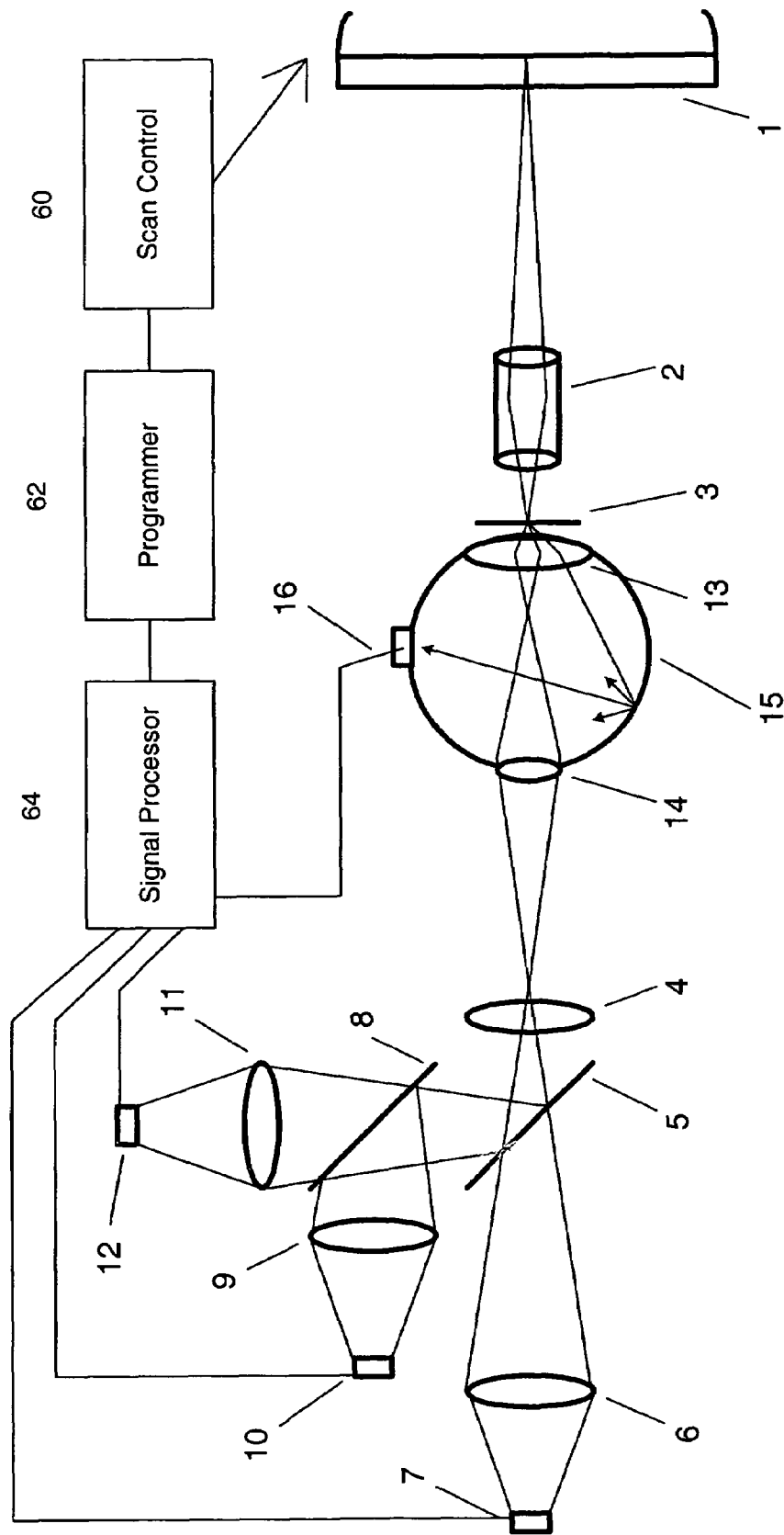
FIG. 6: is a schematic view of a telecine embodying the invention with programmable control.

FIG. 6 shows the addition of a scan controller 60 and programmer 62 along with a signal processor 64 to achieve various preprogrammed effects. Commercially available programmers are known, such as the Da Vinci or Pandora preprogrammers. In combination with the scan control 60 which applies the addresses and signals for scanning to the CRT, the programmed operation may turn correction on, off or adjust the amount of correction from scene to scene of a film, or frame to frame. This can be achieved by recording the control settings of the scratch corrector in the programmer 62 and applying these with the programmer 62 from frame to frame. This is by applying control signals to the signal processor 64 which includes the correction circuitry as previously described in relation to FIG. 4.

In a similar manner, adjustment may be made to a part of a frame. For example, one region of a film frame may require different adjustment from another due to heavy scratches in one region and lighter scratches in another. Accordingly, the scan control and programmer can adjust the compensation applied by the signal processor 64 when scanning addresses fall within a given range. The simplest form would be to select control within a given rectangle of an image by counting the address count across each line and comparing to adjustable numbers representing the left and right sides of the rectangle. If the pixel count is between these two numbers and the line count from the top of the frame is between a second pair of numbers, then the appropriate adjustment is applied. This principle can be extended to select any shape by manipulation of the numbers or using look up tables.

The invention claimed is:

1. A film scanner for converting images on film into electrical signals, comprising:
   a light source for scanning film;
   collection optics arranged to image light transmitted by the film through an imaged light path;
   one or more image light sensors arranged to receive the light from the collection optics through the imaged-light path and to produce one or more image signals representative of an image on the film;
   a reflector arrangement defining an internally reflective cavity and having at least one entrance aperture for receiving light transmitted by the film and one exit aperture for passing light to the one or more image light detectors and arranged to surround at least a portion of the imaged-light path;
   a scattered light sensor arranged in relation to the reflector arrangement to receive light which has been transmitted through the film but scattered by the film from the imaged-light path and reflected within the internally reflective cavity to produce a scattered light signal representative of the scattered light; and
   processing circuitry configured to receive the one or more image signals and the scattered light signal and having functionality to compensate the one or more image signals with reference to the scattered light signal.

2. A film scanner according to claim 1, wherein the reflector arrangement comprises an integrating sphere.

3. A film scanner according to any one of claims 1 or 2, wherein the reflector arrangement includes a light collection lens system.

4. A film scanner according to claim 3, wherein the light collection lens system comprises a first lens near the entrance aperture.

5. A film scanner according to claim 3, wherein the light collection lens system comprises a second lens after the exit aperture.

6. A film scanner according to claim 3, further comprising a scanning lens for imaging the light source onto film, wherein the light collection lens system comprises a first lens near the entrance aperture and wherein the exit aperture is circular and has a diameter substantially equal to the diameter of the image of the scanning lens formed by the first lens.

7. A film scanner according to claim 1, wherein the scattered light sensor is arranged to receive scattered light through a further exit aperture of the reflector arrangement.

8. A film scanner according to claim 7, wherein the further exit aperture is at one side of the cavity.

9. A film scanner according to claim 1, wherein the processing circuitry includes a summing unit for summing a function of the scattered light signal with each of the one or more image signals.

10. A film scanner according to claim 1, wherein the one or more image signals are three image signals each representing respectively red, green and blue light, and wherein the collection optics are arranged to image light onto respective red, green and blue image light sensors via colour splitting optics.

11. A film scanner according to claim 10, wherein the function of the scattered light signal includes the scattered light signal and the red, green and blue image signals.

12. A film scanner according to any one of claims 10 or 11, wherein the function is:

(Scratch signal×k×colour)/(a×red+b×green+c×blue)

where: "scratch signal" is the scattered light signal
"k" is a variable constant
"Colour" is the relevant colour image signal
"Red, green, blue" are the colour image signals
"a, b, c" are constants.

13. A film scanner according to any one of claims 9, 10, or 11, wherein the processing circuitry includes a correction unit for correcting the scattered light signal for variations in the brightness of the light source.

14. A film scanner according to claim 13, further comprising three reference sensors, one each for red, green and blue light for producing signals representative of variations in the brightness of the light source, and wherein the correction unit produces a function of the signals received each of red, green and blue reference sensors.

15. A film scanner according to claim 14, wherein the function is a sum of the red, green and blue reference signals in variable proportions.

16. A film scanner according to claim 1, wherein the reflector arrangement is arranged between the film and subsequent light splitting and collection optics.

17. A telecine comprising a film scanner according to any one of claims 1, 2, 7, 8, 9, 10, 11 or 16.

18. A light collection system for a film scanner in which film is scanned with a light source and light transmitted by the film is imaged through an imaged-light path onto one or more image light detectors for producing one or more image signals representative of an image on film, comprising:
 a reflector arrangement having an internally reflective cavity and at least one entrance aperture for receiving light transmitted by the film and one exit aperture for passing light to the one or more image light detectors;
 a scattered light detector for detecting light which has been transmitted through the film but scattered by the film from the imaged-light path and reflected within the internally reflective cavity to produce a scattered light signal representative of the scattered light; and
 processing circuitry configured to receive the one or more image signals and the scattered light signal and having functionality to compensate the one or more image signals with reference to the scattered light signal.

19. A light collection system according to claim 18, wherein the reflector arrangement comprises an integrating sphere.

20. A light collection system according to claim 18, wherein the reflector arrangement includes a light collection lens system.

21. A light collection system according to claim 20, wherein the light collection lens system comprises a first lens near the entrance aperture.

22. A light collection system according to claim 20, wherein the light collection lens system comprises a second lens after the exit aperture.

23. A light collection system according to claim 22, in which the film scanner has a scanning lens for imaging the light source onto film, wherein the light collection lens system comprises a first lens near the entrance aperture and wherein the exit aperture is circular and has a diameter of the image of the scanning lens formed by the first lens.

24. A light collection system according to any one of claims 18, 19, 20 or 21, wherein the scattered light detector is arranged to receive scattered light through a further exit aperture of the reflector arrangement.

25. A light collection system according to claim 24, wherein the further exit aperture is at one side of the cavity.

26. A light collection system according to any one of claims 18, 19, 20 or 21, wherein the processing circuitry includes a summing unit for summing a function of the scattered light signal with each of the one or more image signals.

27. A light collection system according to any one of claims 18, 19, 20 or 21, wherein the one or more image signals are three image signals each representing red, green and blue light, and wherein the collection optics are arranged to image light onto respective red, green and blue image light sensors via colour splitting optics.

28. A light collection system according to claim 27, wherein the function of the scattered light signal includes the scattered light signal and one or more of the red, green and blue image signals.

29. A light collection system according to claim 28, wherein the function is:

(Scratch signal×k×colour)/(a×red+b×green+c×blue)

where: "scratch signal" is the scattered light signal
"k" is a variable constant
"Colour" is the relevant colour image signal
"Red, green, blue" are the colour image signals
"a,b,c" are constants.

30. A light collection system according to claim 27, wherein the processing circuitry includes a correction unit for correcting the scattered light signal for variations in the brightness of the light source.

31. A light collection system according to claim 30, further comprising three reference sensors, one each for red, green and blue light for producing signals representative of variations in the brightness of the light source, and wherein the correction unit produces a function of the signals received each of red, green and blue reference sensors.

32. A light collection system according to claim 31, wherein the function is a sum of the red, green and blue reference signals in variable proportions.

* * * * *